July 29, 1947.    J. DE SWART    2,424,804
PASS-THROUGH INSULATOR
Filed March 23, 1946

INVENTOR.
Jan de Swart
BY
Cromwell, Greist & Warden
ATTORNEYS

Patented July 29, 1947

2,424,804

UNITED STATES PATENT OFFICE 2,424,804

PASS-THROUGH INSULATOR

Jan de Swart, Los Angeles, Calif., assignor to Shellmar Products Corporation, Mount Vernon, Ohio, a corporation of Delaware Application March 23, 1946, Serial No. 656,590

5 Claims. (Cl. 174—153)

My invention is concerned with an electrical connecting member or pass-through.

It is an object of my invention to provide an electrical connecting member for use in connecting electrical wiring through an apertured panel or the like, particularly where one side of the panel is inaccessible.

In the manufacture of electrical instruments such as radios or the like, it is frequently desirable to provide a connecting device for installation in an apertured panel, whereby a wire, which is on an inaccessible side of the panel, may be soldered to one end of the connecting device after which the device may be secured in the aperture in the panel and the other end of the device may be connected by soldering to a wire on the accessible side of the panel to electrically connect the wires through the panel.

It is a further object of my invention to provide a pass-through, for installation in an apertured panel, which can be installed without shock or pressure to delicate instruments, and which, when installed, is shake-proof and has superior bearing qualities.

It is also an object of my invention to provide a pass-through comprising an insulated metal core and means for securing it in an aperture in a panel wherein the insulating element may comprise compression molded thermosetting plastic material having outstanding dielectric properties.

These and other objects of my invention will be apparent from a description of the preferred form of my device which is shown, by way of illustration, in the accompanying drawings, wherein:

Fig. 1 is a perspective view of the outer or securing sleeve element of my pass-through;

Figure 1:
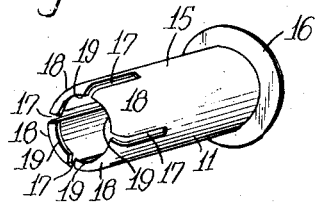
Figure 2:
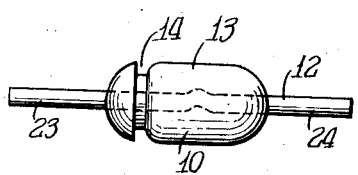
Fig. 2 is an elevation of the inner or connecting element of my pass-through comprising the metal core and its insulator.

The preferred form of my device, as illustrated in the drawings, comprises two main elements, an inner insulated connecting element 10 and an outer securing sleeve 11.

The inner connecting element 10 comprises a rod-like core member 12 and a molded plastic insulator member 13. The insulator member 13 is generally tubular in shape and is provided at one end with a circumferential groove or recess 14 for a purpose which will be described. It is generally desirable to place the groove 14 at one end of the member 13, but there may be situations where it will be desirable to provide the groove 14 at another point intermediate the ends of the member 13. The ends of the member 13 are rounded to enhance the appearance of the same but may be made in any desired configuration.

The securing sleeve 11 comprises a relatively thin walled tubular portion 15 terminating at one end in an outwardly directed rim or flange 16. At the other end of the tubular portion 15 axially directed slots 17 divide the end of the tube into a plurality of finger-like portions 18. The outer edge of each finger 18 is inwardly directed at 19. The element 11 is constructed of relatively resilient but deformable material, preferably thin metal.

Figure 3:
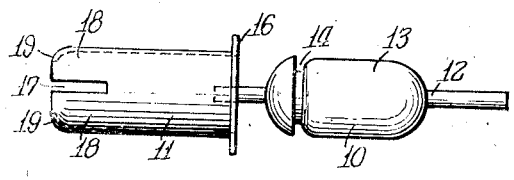
Fig. 3 is an elevation illustrating the two elements of my pass-through just prior to their assembly.
Figure 4:
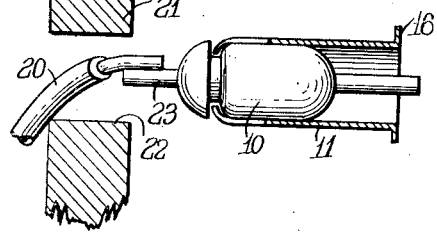
Fig. 4 is a view showing my pass-through with a wire soldered to one end thereof and in position to be inserted in an aperture in a partition.

The elements 10 and 11 are assembled by inserting the element 10 in the element 11 as illustrated in Figs. 3 and 4. The inturned edges 19 of the resilient fingers 18 are seated in the groove 14 of the element 10 and the tubular portion 15 of element 11 extends a substantial distance beyond the outer end of the insulator member 13 to locate the flange 16 a substantial distance beyond the end of the insulator 13.

Figure 5:
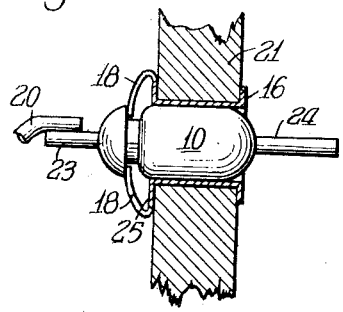
Fig. 5 is a view similar to Fig. 4 showing my pass-through secured in the aperture in the partition.
Figure 6:
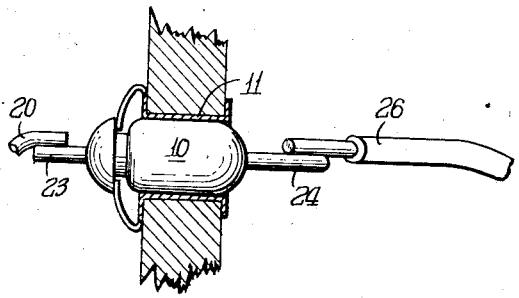
Fig. 6 is a view similar to Fig. 5 showing the other end of the core of the pass-through soldered to a wire.

The use of my device is illustrated in Figs. 4 to 6. The end of the electrical wire 20, which may be located on the inaccessible side of an apertured panel 21, is drawn through the aperture 22 and soldered to the end 23 of the wire member 12 of the inner element 10 of my connecting device. The connecting device is then positioned in the aperture 22 with the flange 16 in engagement with the outer or accessible surface of the partition 21. The element 11 is then held immovable by applying pressure against the flange 16 and the element 10 is moved outwardly towards the flange 16 by gripping the end 24 of the member 12 and applying tension thereto. The movement of the element 10 causes the fingers 18 of the element 11 to buckle outwardly to form a shoulder 25 in engagement with the inner or inaccessible surface of the partition 21. The end 24 of the wire core 12 is then soldered to the end of the wire 26 to complete the installation.

In the manufacture of my device I prefer to make sleeve 11 of a thin light metal but other appropriate materials may be used. The core 12 of the inner element 10 should be a good conductor such as copper or brass. I prefer to make the insulator of an appropriate thermosetting plastic having high dielectric properties.

Figure 7:
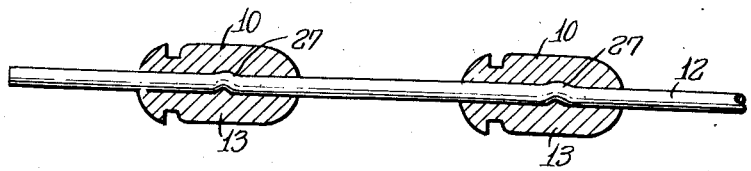
Fig. 7 is a view illustrating the method of molding a plurality of the inner elements of my device.

In Fig. 7 I have illustrated a method of continuously molding a plurality of inner elements 10. In this method the core is made up of wire provided at spaced intervals with flattened or dimpled portions 27, and the insulator members are formed around the wire at the flattened points 27 by compression molding of an appropriate thermosetting plastic material. This method of producing the inner elements permits rapid production of the same.

My device is readily installed in a panel without shock or damage to delicate instruments and when secured in position in the aperture provides a strong, reliable and shake-proof connection. It is capable of rapid and economical manufacture using materials which are particularly desirable for this type of connector.

While I have referred to specific details of construction and specific materials in describing the preferred form of my device it will be understood that other details of construction and other materials may be resorted to within the scope of my invention.

I claim:

1. A rod-like electrical conductor, an insulator secured around said conductor and means for securing said insulator in the aperture of an apertured member, comprising a sleeve-like element having a body portion of slightly less cross sectional diameter than said aperture, said element having on one end outwardly directed abutment means engageable with one side of said apertured member and on the other end inwardly directed deformable means engageable with the corresponding end of said insulator and said inwardly directed means being deformable upon axial movement of said insulator relative to said sleeve-like element in an outward direction to form an abutment for engagement with the other side of said apertured member.

2. An electrical pass-through comprising a rod-like conductor member, a plastic insulator surrounding said conductor member, a recess intermediate the ends of said insulator, a tubular sleeve telescoping said insulator, an inwardly directed radially bendable member on said sleeve extending into said recess, an outwardly directed abutment on said sleeve in spaced relation to said bendable member, whereby the pass-through may be inserted in an apertured partition and by axial movement of said sleeve relative to said insulator said bendable member will be bent to form with said outwardly directed abutment cooperating abutment members for engaging opposite sides of said partition to secure said pass-through in the aperture in the same.

3. An electrical pass-through comprising a rod-like metal core, a plastic insulator surrounding said core and provided with a circumferential groove intermediate its ends, a tubular sleeve surrounding said insulator and having inwardly directed deformable fingers on one end extending into said groove, an outwardly directed abutment on the other end of said sleeve, whereby when said pass-through is inserted in an apertured partition and said insulator is moved axially toward the abutment end of said sleeve said fingers will be deformed to form with said outwardly directed abutment cooperating abutment members for engaging opposite sides of said partition and securing said pass-through in the aperture in the same.

4. An electrical connector comprising a wire-like core, a plastic insulator member molded around said core, a circumferential groove on said insulator, a tube-like sleeve telescoped over said insulator member, one end of said sleeve being provided with inwardly directed expandible finger portions extending into the circumferential groove on said insulator member, the other end of said sleeve extending beyond the end of said insulator member and an outwardly directed abutment shoulder on said sleeve member whereby when the connector is placed in an aperture in a partition, or the like, with said abutment shoulder in engagement with one side of the partition and with said finger portions extending beyond the other side of said partition, said core may be pulled toward said abutment shoulder to move said insulator member in that direction to cause said fingers to expand outwardly and form a shoulder engaging said other side of said partition, said shoulder cooperating with said abutment shoulder to secure said connector in said opening.

5. An electrical connection comprising a metal wire-like core, a molded plastic insulator member surrounding said core, a circumferential groove adjacent one end of said insulator member, a relatively thin metal tube-like sleeve surrounding said plastic member, one end of said sleeve being slotted and inwardly directed to provide bendable fingers extending into the circumferential groove in said insulator member, the other end of said sleeve extending beyond the end of said insulator member and an outwardly directed flange portion on said other end of said sleeve whereby when the connection is placed in an aperture in a partition, or the like, with said flange portion of said sleeve in engagement with one side of the partition and with the slotted end of said sleeve extending beyond the other side of said partition, tension may be applied to said core in the direction of said flange portion to move said insulator member sufficiently in that direction to cause said fingers to buckle outwardly and form a shoulder engaging said other side of said partition, said shoulder cooperating with said flange portion to secure said connection in said opening.

JAN DE SWART.

REFERENCES CITED

The following references are of record in the file of this patent:

UNITED STATES PATENTS

| Number | Name | Date |
|---|---|---|
| 2,219,327 | Miller | Oct. 29, 1940 |
| 1,129,603 | Quackenbush | Feb. 23, 1915 |
| Re. 13,529 | Thorardson | Feb. 11, 1913 |
| 2,115,495 | Mapelsden | Apr. 26, 1938 |
| 2,206,913 | Miller | July 9, 1940 |